March 21, 1967  F. F. EHRICH  3,309,867
AXIAL FLOW SEPARATOR
Filed March 31, 1965
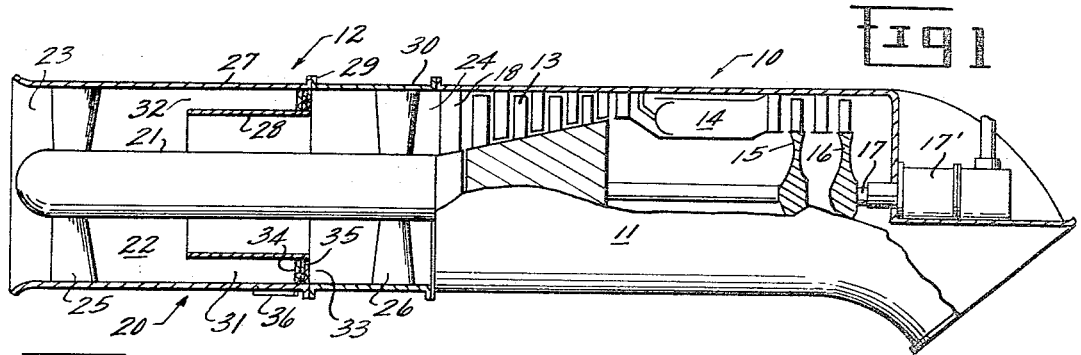
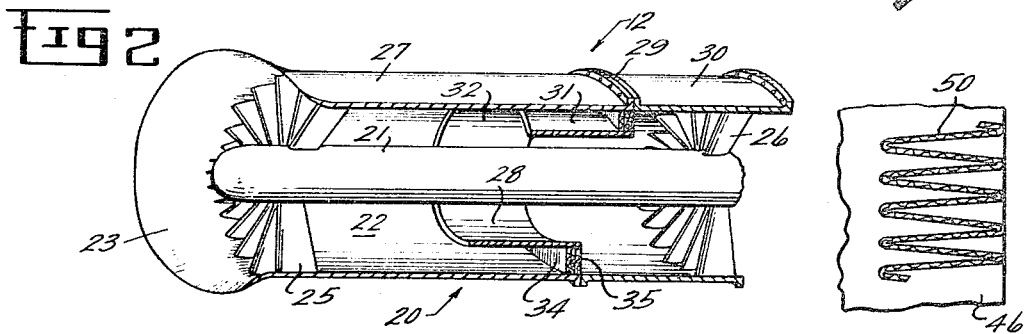
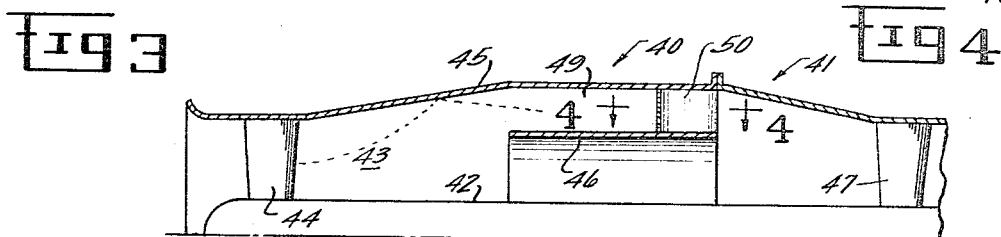
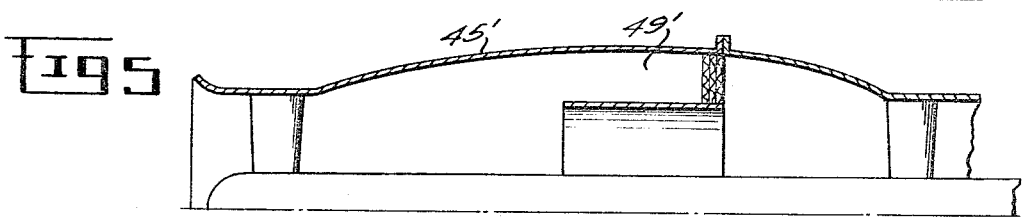
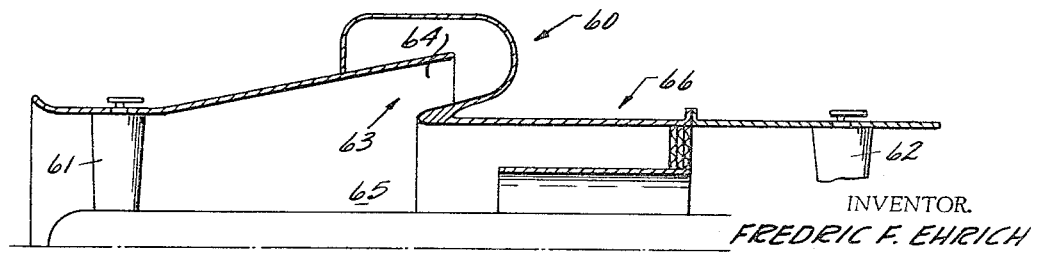
INVENTOR.
FREDRIC F. EHRICH
BY
George R. Powers
ATTORNEY

3,309,867
AXIAL FLOW SEPARATOR
Fredric Franklin Ehrich, Marblehead, Mass., assignor to General Electric Company, a corporation of New York
Filed Mar. 31, 1965, Ser. No. 444,264
16 Claims. (Cl. 60—39.09)

This invention relates to axial flow separators for removing extraneous matter from fluid streams and, more particularly, to axial flow separators having improved means for more efficiently collecting and removing extraneous matter. The invention is particularly suited for use in aircraft installations where it is desired to remove foreign matter such as sand, dust, and water from the air stream supplied to a gas turbine engine.

Aircraft gas turbine engines are particularly susceptible to damage from foreign objects introduced into the air inlets of the engines. This problem has been most acute in the past with respect to relatively large foreign objects such as stones, gravel, birds, hail, and the like which when introduced into the engine can cause instant and massive damage. With the advent of gas turbine powered helicopters and other vertical take-off and landing (VTOL) aircraft, smaller particles of foreign matter such as sand, dust, and water have become increasingly troublesome due primarily to the conditions under which such aircraft may be operated. Because of its VTOL capability, this type of aircraft may be utilized in areas where conventional airfields are nonexistent, such as in combat zones and in other isolated areas. Helicopters and other VTOL aircraft are also especially suited for certain low altitude missions on both land and sea, these missions including close combat support, search-and-rescue, and anti-submarine warfare. Under these and related conditions, substantial quantities of small foreign objects such as sand and dust particles and droplets of water may become entrained in the air stream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of engine blading by high velocity particles. In addition to erosion, extraneous matter, particularly salt water, introduced into the engine in this manner can cause rapid and destructive corrosion.

It is therefore desirable to provide means for separating out the particles of sand, dust, water, and the like before the air stream is supplied to the engine. To be satisfactory, it is essential that the separator chosen to provide this function be effective in removing the unwanted particles from the air stream. High efficiency is particularly desirable in an aircraft separator in view of the large quantities of air and, consequently, the large quantities of extraneous particles, consumed by a gas turbine engine. However, high separating efficiency alone is not the only characteristic required of a separator used in conjunction with an aircraft gas turbine engine. Since the separator is an intimate part of the complete aircraft powerplant, it should not affect adversely the overall powerplant efficiency; in other words, the pressure losses in the air stream flowing through the separator should be as small as possible. In addition, the separator should be effective in removing extraneous matter without allowing either the extracted matter or ice which may form on the extraction means during aircraft operation to block the fluid passageway so as to cause an undesired reduction in the rate of air flow to the engine (an excessive pressure drop) and an accompanying loss of power. In addition to the loss of engine power, a reduced air flow rate of sufficient magnitude may cause engine failure due to severe overtemperature conditions in the combustor and turbine. Furthermore, the separator should be compact and lightweight since aircraft generally, and VTOL aircraft in particular, have very stringent weight limitations. Finally, it should have the above characteristics without being excessively complicated and expensive, both to manufacture and to maintain.

It is thus a primary object of this invention to provide an improved separator for efficiently removing extraneous matter from a fluid stream.

Another object of this invention is to provide a separator which is highly effective in removing extraneous matter from a fluid stream without causing significant pressure losses in the fluid stream.

Another object of this invention is to provide for a gas turbine engine an effective separator for removing extraneous matter from the air stream in which blockage of the extraction apparatus does not cause excessive pressure losses, reduced air flow, loss of engine power, and other undesired results.

Still another object is to provide a lightweight and compact separator for effectively removing small particles of sand, dust, water, and the like from the air stream supplied to an aircraft gas turbine engine.

A further object is to provide for a gas turbine engine a separator which is efficient in removing particles of sand, dust, water, and the like from the entering air stream without causing excessive pressure losses in the air stream.

A still further object is to provide a separator capable of effectively removing small foreign objects from a fluid stream over a broad range of operating conditions.

Yet another object is to provide a separator capable of attaining the above objects without being excessively complicated and expensive.

Briefly stated, in carrying out the invention in one form thereof particularly suited for use in a gas turbine engine, a separator having an axially extending passageway formed therein has means adjacent its inlet for imparting swirl to a fluid stream and collection means downstream of the swirl producing means. The collection means is formed by outer wall members comprising a first annular wall member and a second annular wall member coaxially mounted with respect to the first wall member. The upstream end of the second wall member is of substantially smaller diameter than the axially corresponding portion of the first wall member such that an annular extraction cavity having substantial radial extent is defined between the first and second wall members. As a result of the swirl imparted to the fluid stream, particles of extraneous matter are forced outwardly and enter the extraction cavity. By fluid communication means connecting the annular cavity to the axial passageway, the fluid entering the cavity with the extraneous matter may re-enter the main stream of fluid. Filter means are located in the communication means to prevent the return of extraneous matter to the axial passageway along with the fluid. If it is desired to remove all or a portion of the swirl from the fluid stream after the extraneous matter is removed, means may be provided downstream of the collection means for removing the swirl.

By a further aspect of the invention, the first wall member may diverge downstream of the swirl producing vanes or have another characteristic contour such that it is a focusing wall which will direct extraneous matter striking it into the annular extraction cavity. By yet another aspect of the invention, the collection means of this invention may be used in multiples or in combination with other separating arrangements. In this respect, this collection means is particularly suited for use in combination with the novel separating arrangement described and claimed in a copending application entitled, "Axial Flow Separator," Ser. No. 443,193, filed Mar. 29, 1965, in the name of Francis E. Driscoll, and assigned to the assignee of this invention. Also in accordance with the invention, the swirl producing and removing means may be adjustable so as to provide effective operation over a broad range of conditions, including conditions under which no separation is required.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a cross sectional view of a gas turbine engine of the turbo shaft type having a separator formed in accordance with the present invention mounted thereon;

FIG. 2 is a perspective view, partially in section, of the separator of FIG. 1;

FIG. 3 is a cross sectional view of a separator formed in accordance with the present invention in which one of the wall members is of frusto-conical form so as to be a focusing wall;

FIG. 4 is a view taken along viewing line 4—4 of FIG. 3;

FIG. 5 is a view similar to FIG. 3 illustrating an alternative form of focusing wall; and FIG. 6 is a view showing a separator formed in accordance with this invention used in combination with another form of separator.

With reference to FIG. 1, a gas turbine engine assembly 10 is illustrated, the assembly 10 including gas turbine engine 11 of the turboshaft type and an axial flow separator 12 formed in accordance with the present invention. The engine 11 includes in axially spaced serial flow arrangement a compressor 13, an annular combustor 14, a gas generator turbine 15 for driving the compressor 13, and a power turbine 16 driving an output shaft 17. The turboshaft engine 11 illustrated is particulated suited for helicopter applications in which the helicopter rotor (not shown) is driven by the output shaft 17 through suitable speed reduction means 17'. As this description proceeds, however, it will become obvious to those skilled in the art that the separator may be used in conjunction with turbojet and turboprop engines as well as turboshaft engines since the separator is essentially suited for all forms of turbine engines.

As illustrated by FIGS. 1 and 2, the separator 12 is a static component having no moving parts. More particularly, the separator 12 has an outer casing or housing indicated generally by the numeral 20 and an inner fairing 21 defining therebetween an axially extending annular passageway 22 having at opposite ends thereof an annular inlet 23 and an annular outlet 24 communicating with the compressor inlet guide vanes 18. A row of circumferentially spaced radially extending turning vanes 25 is located adjacent the inlet 23, the vanes 25 having a desired turning configuration which will be described presently. Another row of circumferentially spaced radially extending vanes 26 is located adjacent the outlet 24, the vanes 26 also having a required configuration. Intermediate the vanes 25 and 26 is a collection arrangement comprising a first wall member 27 and a second wall member 28, the first wall member 27 being, in the illustrated embodiment, a cylindrical part of the outer housing 20 intermediate the turning vanes 25 and a circumferential flange 29 at which the downstream end of the first wall member 27 is secured to an aft section 30 of the casing 20. The second wall member 28, which is a cylindrical element coaxially located with respect to the first wall member 27 and the separator axis and supported from the first wall member 27 by supports 35 has its upstream end located downstream of the turning vanes 25 an axial distance described in greater detail at a later point in this specification. The second wall member 28 is of substantially smaller diameter than the first wall member 27. As a result, an annular extraction cavity 31 having substantial radial extent is defined between the wall members. The cavity 31 thus has an annular inlet 32 at its upstream end and an annular outlet 33 at its downstream end, the inlet 32 and the outlet 33 being defined between the first wall member 27 and the second wall member 28 to provide fluid communication between the annular passageway 22 and the cavity 31. To prevent particles of extraneous matter which enter the cavity 31 in the manner described below from re-entering the passageway 22 through the outlet 33, an annular filter 34 connects the first wall member 27 and the second wall member 28 at the downstream end of the second wall member 28. So that the overall efficiency of the entire powerplant will not be adversely affected, the annular filter 34 should be a low pressure drop barrier filter; as an example of a suitable material, the filter 34 may be comprised of a porous foam material. Other suitable materials will also occur to those skilled in the art.

During operation of the turboshaft engine 11, the low pressure area existing at the inlet to the compressor 13 causes air to flow through the annular passageway 22 at high velocity. As the air passes over the stationary turning vanes 25, it is turned circumferentially such that downstream of the vanes 25 the air stream has both angular and axial velocity. This is known as imparting "swirl" to the fluid stream. Small particles of foreign matter entrained in the air stream are also turned, this turning resulting primarily from the particles, which have small mass, being carried along with the swirling air. To assure that particles having greater mass are also turned by the turning vanes, it may be desirable to overlap adjacent vanes circumferentially so that a particle cannot pass axially between adjacent vanes without striking vane and thereby being turned. A particle entrained in the air stream and turned will have both tangential and axial velocity downstream of the turning vanes 25. In theory, a particle leaving the vanes 25 with both tangential and axial velocity and not being subject to any external forces will follow a straight line path to the outer periphery of passageway 22 at some point downstream of the vanes. In practice, however, the swirling air has a significant effect on the particle's trajectory; its actual trajectory can be compared roughly to that of a helix having increasing diameter in the downstream direction.

In the preferred practice of the present invention, the turning vanes 25 have a turning configuration which will cause the entrained extraneous matter to reach the outer periphery of the passageway 22 upstream of the second wall member and either flow directly into the annular cavity 31 through its inlet 32 or strike the first wall member 27 and rebound therefrom into the cavity 31. Once the particles enter the cavity 31, the annular barrier filter 34 prevents their return to the axial passageway 22. The particles are thus collected in the cavity 31 where they remain until the engine 11 is shut down. With the powerplant inoperative, the particles may be removed through a clean out port 35 by suitable means such as a vacuum hose (not shown) inserted through the port 35. At this point, it will be obvious to those skilled in the art that the volume of the cavity 31 should be sufficient to contain all particles which may be encountered during operation under extremely adverse conditions. Consequently, the second wall member 28 should have an axial length sufficient to provide the required volume. This length will become apparent to the designer of a particular sparator utilizing this invention for use under specified conditions.

Under certain operating conditions, the volume of particles collected in the cavity 31 may be sufficient to block the flow of air through the annular filter 34. Similarly, ice may form under adverse atmospheric conditions and block the flow of air from the cavity 31 to the axial passageway. While neither of these situations is desirable, the passageway 22 is not completely blocked since the inner portion of the passageway between the inner fairing 21 and the second wall member 28 is still open to flow. Consequently, even though the barrier filter 34 may be blocked by either collected particles of extraneous matter or ice, sufficient air may still reach the engine for maintaining adequate power and for preventing severe over-temperature conditions.

As noted previously, the first wall member 27 is secured to the aft section 30 of the casing 20 at a flange 29. By disassembling the separator 12 at this flange, the annular filter 34 may be easily removed for inspection, repair, or replacement. The cavity 31 may also, of course, be easily cleaned in this manner.

Reference has been made above to a copending patent application of Driscoll. Driscoll teaches the use of a focusing or diverging wall for directing particles of extraneous matter into a collection means dissimilar to the arrangement of this invention. For a disclosure of Driscoll's arrangement, attention is directed to the copending application and to FIG. 5 where the separator of the present invention is illustrated in combination with Driscoll's separator. However, the present invention may also be utilized with a focusing wall of the type described and claimed by Driscoll. For example, with reference to FIG. 3, a separator 40 is basically similar to the one illustrated by FIGS. 1 and 2 in that it has a housing 41 and an inner fairing 42 defining therebetween an axial passageway 43, inlet swirl vanes 44, a first wall member 45, a second cylindrical wall member 46, and outlet deswirl vanes 47. Instead of being cylindrical, the wall member 45 is contoured so as to be a frusto-conically shaped focusing wall upstream of the second wall member 46 for directing particles striking the wall 45 into an extraction cavity 49. While a substantial portion of the particles will flow directly into an extraction cavity 49 formed between the walls 45 and 46, many particles will strike the diverging surface of the first wall member 45 and rebound therefrom. The amount of divergence is selected such that particles bouncing off the first wall member 45 will enter the annular cavity 49 as illustrated in FIG. 3 by a broken line representing the trajectory of a typical particle. The barrier filter 50 differs from the filter 34 in that the filter 50 is pleated, this being best illustrated by FIG. 4. The pleated filter 50 has certain advantages in that dirt and other particles of extraneous matter may be trapped in the convolutions. Consequently, the particles are less likely to become dislodged and fall into the main passageway 43 when the separator 40 is not operating. Furthermore, the pleated filter material provides much more filter area in a limited space so that pressure drop will be minimized and total collection capability will be maximized.

The separator illustrated by FIG. 5 is similar in many respects to the separator of FIG. 3; accordingly similar elements are designated by primed numerals. Instead of being of frusto-conical shape, the diverging wall member 45' is contoured so as to be a focusing wall for directing particles striking the wall into the cavity 49'. The wall member 45' is contoured to take advantage of the well-known natural law that an object striking a smooth surface will be reflected at an angle equal to the angle of incidence. In a given separator having a known swirl pattern, an optimum wall contour can be generated experimentally since any particular portion of the wall surface will be struck repeatedly by particles having substantially identical trajectories. As a result, there will be an optimum divergence or local slope at each portion of the wall for directing particles striking that portion into the annular extraction slot. The locus of all of these local slopes thus defines the optimum contour for the entire wall surface.

From the foregoing, it will be evident that different optimum wall contours may be desired under various conditions. With the basic concepts understood, optimum wall contours for various applications may be generated both mathematically and experimentally. In determining the required contour of a focusing wall, various factors should be considered. These factors include the nature of the fluid in which the extraneous matter is entrained, the type of particles, their mass, velocity, radial distribution, etc. The turning configuration of the swirl vanes is, of course, an important factor to be considered.

The foregoing analyses with respect to the separators of FIGS. 3–5 are somewhat crude in that it is assumed that the particles are travelling in only two dimensions where they are actually being swirled about the axes of the separators in addition to having axial and radial motion. Nevertheless, it has been found that this type of approach is quite accurate in determining optimum wall configurations under various operating conditions. At an earlier point in this specification, it was pointed out that the swirl and deswirl vanes have a desired turning configuration. With respect to the swirl vanes, it was explained that the turning configuration is such that entrained particles will reach the outer periphery of the fluid passageway upstream of the second wall member. It is extremely difficult to define the precise turning configuration with greater particularity since the configuration will depend in large measure on certain factors of the type discussed above with respect to the focusing wall, these including the nature of the fluid in which the extraneous matter is entrained, the type of particles, their mass, velocity, radial distribution, etc. Two configurations which would certainly receive consideration in the detailed design of any separator formed in accordance with the invention are free vortex and constant turning arrangements. A free vortex design produces high hub swirl and low tip swirl. In such a design, the hub swirl may be excessive while the tip swirl may be inadequate even though particles at the tip have only a short radial distance to traverse. Similarly, a constant turning design may produce excessive swirl at the tip and inadequate swirl at the hub. Consequently, it will be obvious to those skilled in the art that various swirl patterns may be required for optimum separating results under different conditions. With respect to the deswirl vanes, the turning configuration may be defined under most operating conditions to be that required to remove the swirl produced by the swirl vanes. If, however, it is desired to combine the separator and the gas turbine engine into an integral assembly, the inlet guide vanes to the compressor may be deleted. In such a case, the deswirl vanes should direct the air stream to the rotating compressor blades in the manner generally accomplished by the inlet guide vanes. A separator 60 having adjustable inlet swirl vanes 61 and outlet deswirl vanes 62 is illustrated by FIG. 6, the vane angles being adjustable to vary the amount of swirl produced and removed under different operating conditions. By having adjustable swirl and deswirl vanes, the separator 60 is capable of effective separation over a much wider range of operating conditions than would otherwise be possible. In addition, by setting the vanes 61 and 62 so that no swirl is imparted to the air stream, the gas turbine engine powerplant may operate efficiently with minimum losses under conditions where the separating function is not required, such as operation at high altitudes where extraneous matter is not present in the atmosphere.

With reference still being directed to FIG. 6, separation means indicated generally by the numeral 63 is located immediately downstream of the inlet swirl vanes 61, the separation means 63 being of the type described and claimed by the copending Driscoll application. While the Driscoll type of separator is extremely effective in removing small particles of extraneous matter, a small percentage of the particles may miss the slot 64. Of this small percentage, the vast majority of the particles will, of course, be concentrated at the outer periphery of the axial passageway 65. To prevent these particles from reaching the compressor of the associated gas turbine engine, a separator 66 of this invention may be located downstream of the separator 63. In all essential respects, the separator 66 is identical in construction and operation to the arrangement described above with respect to FIGS. 1 and 2.

From the foregoing it will be seen that the improved axial flow separator of this invention is highly efficient in removing small particles of extraneous matter from a fluid stream without causing excessive pressure losses in the fluid stream and without excessively reducing air flow when used in a gas turbine engine assembly. In addition to being highly effective, the separator of this invention is lightweight and compact and and is therefore particularly suited for aircraft applications. Also, since it has no rotating parts and operates at ambient temperature only, the separator is relatively uncomplicated and may be fabricated from materials not having high temperature operational capabilities. As a result, the separator is a relatively inexpensive component, both to manufacture and to maintain.

While preferred embodiments of the invention have been illustrated and described above, it will be understood that various changes and modifications may be made without departing from the spirit and scope of the invention, and it is intended to cover all such changes and modifications by the appended claims.

What is claimed as new and desired to secure by Letters Patent of the United States is:

1. In a gas turbine engine assembly including a compressor, a combustor, and a turbine in serial flow arrangement, a separator for removing extraneous matter from the stream of air supplied to the compressor, and separator comprising:

means forming an axially extending annular passageway having at opposite ends thereof an annular inlet, and an annular outlet communicating with the compressor, a row of circumferentially spaced radially extending turning vanes adjacent said inlet for imparting swirl to the air stream flowing through said passageway, thereby to direct extraneous matter carried by said air stream toward the periphery of said passageway, outer wall means downstream of said swirl producing means defining collection means for receiving the extraneous matter, said collection means comprising a first annular wall member and a second annular wall member coaxially mounted with respect to said first wall member, the upstream end of said second wall member being of substantially smaller diameter than the axially corresponding portion of said first wall member such that an annular collection cavity having substantial radial extent is defined between said first and second wall members, fluid communication means interconnecting said annular collection cavity and said passageway for returning to said passageway air flowing into said cavity with the extraneous matter, and filter means in said fluid communication means for preventing the return of extracted extraneous matter to said passageway through said fluid communication means.

2. An axial flow separator for a gas turbine engine assembly as defined by claim 1 in which said first annular wall member diverges axially downstream from said radial turning vanes and in which the upstream end of said second wall member is located downstream of the upstream end of said first wall member.

3. In a gas turbine engine assembly including a compressor, a combustor, and a turbine in serial flow arrangement, a separator for removing extraneous matter from the stream of air supplied to the compressor, said separator comprising:

an outer casing enclosing an axially extending annular passageway having at opposite ends thereof an annular inlet, and an annular outlet communicating with the compressor, a row of turning vanes adjacent said inlet of said passageway for imparting swirl to an air stream flowing through said passageway, thereby to direct extraneous matter carried by said air stream toward the periphery of said passageway, a substantially cylindrical wall member downstream of said swirl producing vanes defining with said outer casing an annular collection cavity having substantial radial extent, said cavity having an annular inlet at its upstream end for receiving the extraneous matter and an annular outlet at its downstream end each communicating with said annular passageway, annular filter means traversing said outlet of said cavity for preventing the return to said annular passageway of the extraneous matter entering said cavity, and a row of turning vanes adjacent said outlet of said passageway for removing swirl from the air stream before the air stream is supplied to the compressor.

4. An axial flow separator for a gas turbine engine assembly as defined by claim 3 in which said outer casing in the axial interval between said swirl producing vanes and said annular cavity diverges in the axially downstream direction.

5. An axial flow separator for a gas turbine engine assembly as defined by claim 4 in which said swirl producing vanes and said swirl removing vanes are adjustable so that the amount of swirl produced and removed can be varied.

6. In a gas turbine engine assembly including a compressor, a combustor and a turbine in serial flow arrangement, a separator for removing extraneous matter from the stream of air supplied to the compressor, said separator comprising:

means forming an axially extending passageway having an inlet and an outlet at opposite ends thereof, means adjacent said inlet for imparting swirl to a fluid stream flowing through said passageway, thereby to direct extraneous matter carried by said fluid stream toward the periphery of said passageway, collection means spaced axially downstream of said swirl producing means for receiving the extraneous matter, said collection means being located adjacent the outer periphery of said passageway, fluid communication means interconnecting said collection means and said passageway for returning to said passageway the fluid passing into said collection means with said extraneous matter, and means for removing swirl from the air stream before the air stream is supplied to the compressor.

7. An axial flow separator as defined by claim 6 including filter means for preventing the return of extracted extraneous matter to said passageway through said fluid communication means.

8. For removing extraneous matter from a fluid stream, a separator comprising:

means forming an axially extending passageway having an inlet and an outlet at opposite ends thereof, means adjacent said inlet for imparting swirl to a fluid stream flowing through said passageway, outer wall means downstream of said swirl producing means defining at least one collection means for receiving extraneous matter, said collection means comprising a first annular wall member and a second annular wall member coaxially mounted with respect to said first wall member, the upstream end of said second wall member being of substantially smaller diameter than the axially corresponding portion of said first wall member such that an annula rcollection cavity having substantial radical extent is defined between said first and second wall members, fluid communication means interconnecting said annular collection cavity and said passageway for returning to said passageway fluid extracted from said passageway along with extraneous matter, filter means in said fluid communication means for preventing the return of extracted extraneous matter to said passageway through said fluid communication means, and means for removing swirl from the air stream.

9. For removing extraneous matter from a fluid stream, a separator comprising:

means forming an axially extending annular passageway having an annular inlet and an annular outlet at opposite ends thereof, a row circumferentially spaced radially extending turning vanes adjacent said inlet for imparting swirl to a fluid stream flowing through said passageway, outer wall means downstream of said swirl producing means defining collection means for receiving extraneous matter, said collection means comprising a first annular wall member and a second annular wall member coaxially mounted with respect to said first wall member, the upstream end of said second wall member being of substantially smaller diameter than the axially corresponding portion of said first wall member such that an annular collection cavity having substantial radial extent is defined between said first and second wall members, fluid communication means interconnecting said annular collection cavity and said passageway for returning to said passageway fluid extracted from said passageway along with extraneous matter, filter means in said fluid communication means for preventing the return of extracted extraneous matter to said passageway through said fluid communication means, and means for removing swirl from the air stream.

10. An axial flow separator as defined by claim 9 in which said first annular wall member diverges axially downstream from said radial turning vanes and in which the upstream end of said second wall member is located downstream of the upstream end of said first wall member.

11. For removing extraneous matter fom a fluid stream, a separator comprising:

an outer casing enclosing an axially extending annular passageway having an annular inlet and an annular outlet at opposite ends thereof, a row of turning vanes adjacent said inlet of said passageway for imparting swirl to a fluid stream flowing through said passageway, thereby to direct extraneous matter carried by said fluid stream toward the periphery of said passageways, a substantially cylindrical wall member downstream of said swirl producing vanes defining with said outer casing an annular collection cavity having substantial radial extent, said cavity having an annular inlet at its upstream end, and an annular outlet at its downstream end through which the fluid entering said cavity with the extraneous matter may return to said passageway, annular filter means traversing said outlet of said cavity for preventing the return to said annular passageway of extraneous matter entering said cavity, and a row of turning vanes adjacent said outlet of said passageway for removing swirl from the fluid stream.

12. An axial flow separator as defined by claim 11 in which said outer casing in the axial interval between said swirl producing vanes and said annular cavity diverges in the axially downstream direction.

13. An axial flow separator as defined by claim 12 in which said swirl producing vanes and said swirl removing vanes are adjustable so that the amount of swirl produced and removed can be varied.

14. In a gas engine assembly including a compressor, a combustor, and a turbine in serial flow arrangement, a separator for removing extraneous matter from the stream of air supplied to the compressor, said separator comprising:

means defining an axially extending annular passageway having at opposite ends thereof an annular inlet and an annular outlet communicating with the compressor, a row of circumferentially spaced radially extending turning vanes adjacent said inlet for imparting swirl to the air stream flowing through said passageway, outer wall means downstream of said swirl producing vanes defining first collection means for receiving extraneous matter, said first collection means comprising first and second annular wall members forming therebetween an annular extraction slot, means forming a storage space circumferentially surrounding said extraction slot for receiving extraneous matter therefrom, outer wall means downstream of said first collection means defining second collection means for receiving extraneous matter, said second collection means comprising a third annular wall member and a fourth annular wall member coaxially mounted with respect to said third wall member, the upstream end of said fourth wall member being of substantially smaller diameter than the axially corresponding portion of said third wall member such that an annular collection cavity having substantial radial extent is defined between said third and fourth wall member, fluid communication means interconnecting the annular collection cavity defined between said third and fourth wall members and said passageway for returning to said passageway air extracted from said passageway along with extraneous matter, filter means in said fluid communication means for preventing the return of extracted extraneous matter to said passageway through said fluid communication means.

and a row of circumferentially spaced radially extending turning vanes adjacent said outlet of said passageway for removing swirl from the air stream before the air stream is supplied to the compressor.

15. An axial flow separator for a gas turbine engine assembly as defined by claim 14 in which said third annular wall member diverges axially downstream from said first collection means and in which the upstream end of said fourth wall member is located downstream of the upstream end of said third wall member.

16. An axial flow separator for a gas turbine engine assembly as defined by claim 15 in which said swirl producing vanes and said swirl removing vanes are adjustable so that the amount of swirl produced and removed can be varied.

References Cited by the Examiner

UNITED STATES PATENTS

| | | | |
|---|---|---|---|
| 2,193,883 | 3/1940 | Reeves | 55—396 |
| 2,198,190 | 3/1940 | Vokes | 55—306 |
| 2,319,894 | 5/1943 | Vokes | 55—306 |
| 2,487,633 | 11/1949 | Breslove | 55—416 |
| 2,623,610 | 12/1952 | Buechel | 230—132 |
| 2,647,588 | 8/1953 | Miller | 122—51 |
| 2,732,032 | 1/1956 | Sandison | 55—439 |
| 2,802,618 | 8/1957 | Prachar | 230—132 |
| 3,064,411 | 11/1962 | Breslove | 55—457 |

FOREIGN PATENTS 501,959   4/1951   Belgium.

DONLEY J. STOCKING, *Primary Examiner.*

HENRY F. RADUAZO, *Examiner.*